United States Patent [19]

Nakao et al.

[11] 3,946,212
[45] Mar. 23, 1976

[54] AUTOMATIC QUALITY CONTROL SYSTEM

[75] Inventors: Hisaji Nakao; Nobuo Fukuma, both of Toyota; Hideyuki Matsubara, Toyoake; Tadahiro Takasu, Nishio; Takao Yoneda, Kariya, all of Japan

[73] Assignees: Toyoda Koki Kabushiki Kaisha; Toyota Jidosha Kokyo Kabushiki Kaisha, both of Japan

[22] Filed: June 18, 1974

[21] Appl. No.: 480,361

[30] Foreign Application Priority Data
June 18, 1973 Japan.................................. 48-68584

[52] U.S. Cl. ............. 235/151.13; 235/151.1; 444/1
[51] Int. Cl.²................... G06F 15/36; G06F 15/46
[58] Field of Search............ 235/151, 151.1, 151.11, 235/151.13, 151.3; 444/1

[56] References Cited
UNITED STATES PATENTS

| | | | |
|---|---|---|---|
| 3,147,370 | 9/1964 | Lowman......................... | 235/151.13 |
| 3,242,321 | 3/1966 | Chope............................. | 235/151.13 |
| 3,515,860 | 6/1970 | Fitzgerald, Jr.................. | 235/151.13 |
| 3,657,926 | 4/1972 | Munson et al.................. | 235/151.13 |
| 3,809,870 | 5/1974 | Auble et al. .................... | 235/151.3 |

FOREIGN PATENTS OR APPLICATIONS 1,915,293 10/1970 Germany............................... 444/1

OTHER PUBLICATIONS

Smith: Role of Statistical Computation in Machine-Tool Feedback Gaging, Control Engineering Sept. 1957 pp. 190–196.

*Primary Examiner*—Felix D. Gruber
*Attorney, Agent, or Firm*—Oblon, Fisher, Spivak, McClelland & Maier

[57] ABSTRACT

An automatic quality control system for a machine which measures workpieces processed by the machine. An estimated value to be obtained from an unprocessed workpiece depending upon information obtained from previously processed workpieces is calculated and is compared with a predetermined control limit. An instruction signal is generated when the estimated value is beyond the control limit to indicate a need for adjustment of the machine.

13 Claims, 6 Drawing Figures

AUTOMATIC QUALITY CONTROL SYSTEM

BACKGROUND OF THE INVENTION

1. Field of the Invention

The present invention relates to an automatic quality control system, and more particularly to an automatic quality control system useful for work processed under quality control according to estimated characteristics and trends of processing machines based on measured values of processed works. The invention relates more particularly to an automatic quality control system capable of operating control elements to maintain quality standards thereby permitting a reduction in the cost and labor of control processing.

2. Description of the Prior Art

All or most quality control procedures such as measurement of processed work, data processing, estimation of characteristics of processing machines, and inspection of quality deviation have been dependent upon human skill. In such a system, control limits computed on the basis of measured values collected from work portions are used without modification over a certain period until defective quality is encountered. In other words, the prior art has failed to take into consideration the variation in the characteristic and trends of processing machines as they are operated. As a result, the processed work does not always meet predetermined quality standards with the result that productivity is lowered. One solution to this problem has been to narrow the range of control limits. This, however, has necessitated frequent positional adjustment or even change of tools with the result that the processing cost increases. In the prior art, the range of adjustment of tool positions is fixed and it is therefore difficult to adequately compensate for the processing machine characteristics which vary during operation. If the available adjustments are inadequate, the occurrence of defective quality becomes frequent, the tool position must be adjusted often and down time increases causing processing efficiency to be lowered. The need for extra labor in a prior art automated process line arises in most cases from the lack of an efficient feedback system associated with a group of machine tools.

SUMMARY OF THE INVENTION

Accordingly, it is an object of the invention to provide an automatic quality control system capable of operation wherein the measurement of all work which has been processed is automated. The acquisition of data concerning measured work is similarly automated. The processing of data concerning machine characteristics and trends plotted by regression line approximation in a time sequence over a period covering the past, present and future is similarly automated. The processing dimensions are estimated according to the result of the data processed so that the acceptable work being processed does not become inconsistent with the quality standards.

According to the invention, the position of a tool can be adjusted by instruction, control limits can be automatically set or modified to meet varying trends of machines and the optimum position of a tool can be adjusted by instruction under on-line control.

Other objects, features and advantages of the invention will become apparent hereinafter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In FIGS. 1 through 6, reference numeral 10 denotes a computer, 11 a magnetic disk, 12 a teletypewriter, 13 a paper tape reader, 14 a line printer, $M_1$ $M_2$ process machines, 20 and 21 measuring devices, 15 through 18, 24, 25, 28, 29, 33 through 35 and 37 interfaces, 22 and 23 A-D converters, and 26, 27, 30 and 31 terminal devices.

Figure 1:
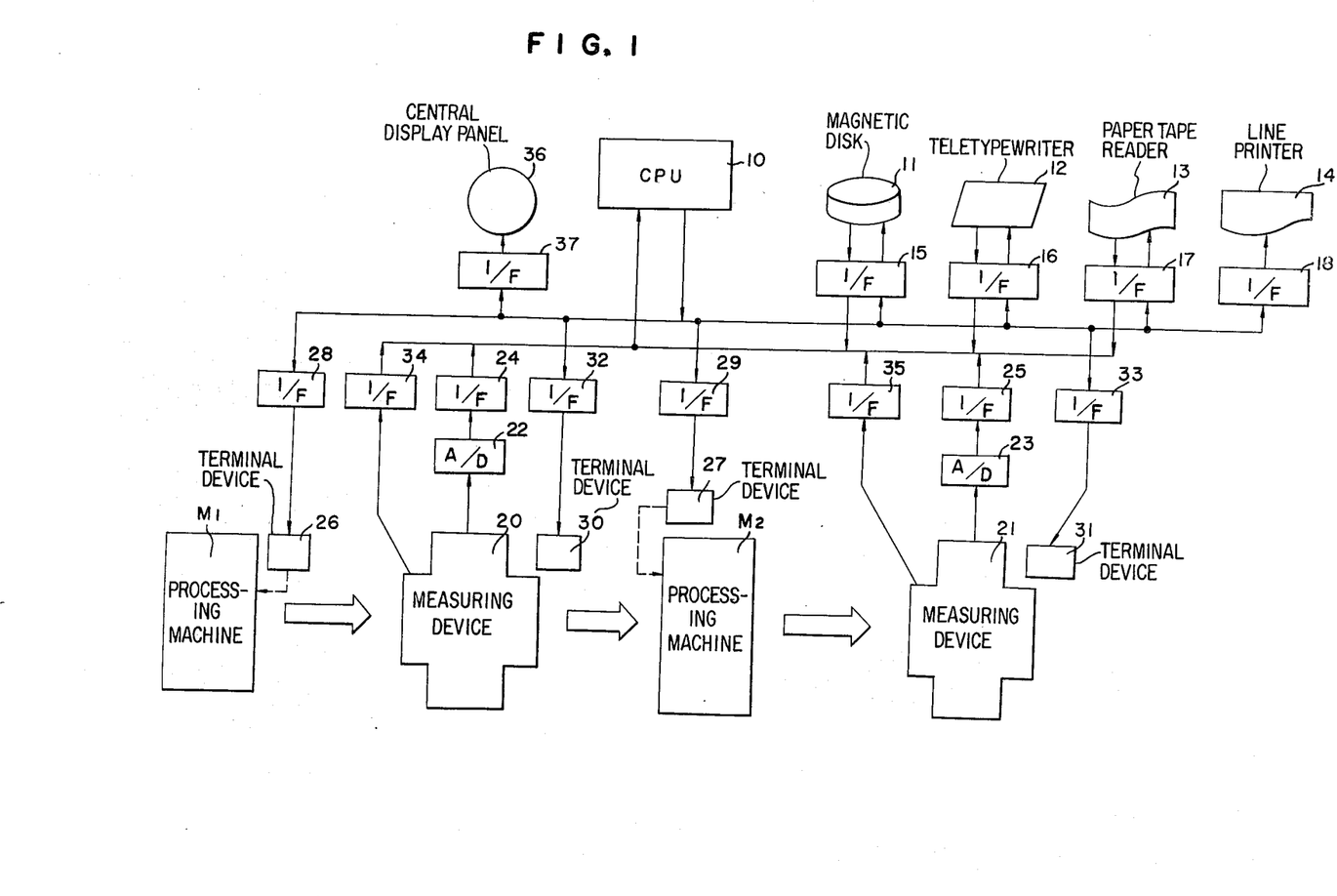
FIG. 1 is a block diagram showing the system of the invention.

With reference to FIG. 1, there is shown a block diagram illustrating an automatic quality control system according to the invention wherein the reference numeral 10 denotes a mini-computer performing central data processing functions in relation to other constituent system components. The numerals 11 through 14 represent a magnetic disk, a teletypewriter, a paper tape reader and a line printer, respectively, operated as peripheral devices for the mini-computer 10 through interfaces 15 to 18. The symbols $M_1$ and $M_2$ stand for processing machines for the first and second process steps. The numerals 20 and 21 denote measuring devices capable of automatically measuring the work at each successive portion of the workpiece performed by processing machines $M_1$ and $M_2$. The measured values are supplied to computer 10 by way of A-D converters 22 and 23 and interfaces 24 and 25. Terminal devices 26 and 27 are connected to the computer 10 by way of interfaces 28 and 29 and are operated to control, by control commands from computer 10, the operation of machines $M_1$ and $M_2$, particularly the operation of the automatic tool position adjusting device, or to display control data or a measured result. In FIG. 1, the dotted lines indicate the supply of control commands from terminal devices 26 and 27 to processing machines $M_1$ and $M_2$. Terminal devices 30 and 31 for the measuring devices 20 and 21 are connected to computer 10 by interfaces 32 and 33 and display measured results for every measured item. The measuring devices 20 and 21 are provided with masters in order to preclude measuring errors inherent in the measuring devices. Thus, the measured value of work at each portion is compensated by comparing the measured value and the mean master value, the mean master value being the average of the values which are obtained by measuring the master three or more times.

The terminal devices 30 and 31 can display the measured result of the master for each measuring item. The numerals 34 and 35 denote interfaces for the work identification signals from measuring devices 20 and 21. The numeral 36 is a central display panel connected to the computer 10 by interface 37 for centrally displaying abnormal states of processing machines $M_1$ and $M_2$ and of measuring devices 20 and 21.

Figure 2:
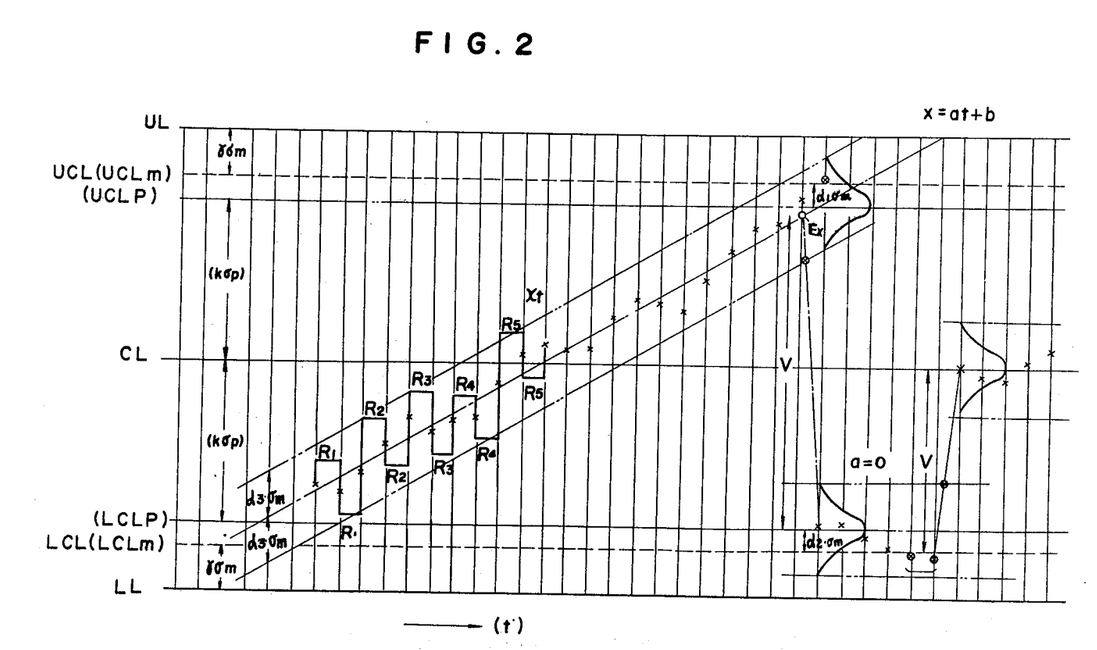
FIG. 2 is a diagram showing the relationship between the trend of measured data, tolerance and control limits.

The processing machine $M_1$ is responsible for the first process step. After processing by the machine $M_1$, the work W is automatically transferred to the measuring device 20. The processed portions of the workpiece are measured by measuring devices installed for the processed portions and the measured values are converted into digital values by the A-D converter 22 and stored in the memory of the computer 10. In the computer, it is determined whether or not the measured value accords with a required value which is registered in the computer. The result is displayed on the terminal device 26 of the processing machine $M_1$ and also on the terminal device 30 of the measuring device 20. When a predetermined number of measured values has been collected the trend change of measured values in accordance with the progress of the processing is calculated and is extended toward the future and an extension is treated as an estimated value to be obtained on the next work. This processing is referred to as trend processing during which it is determined whether the estimated value is within control limits. With reference to FIG. 2, the gradient a of a regression line or a trend line plotted by approximating the measured values, the intercept b, and the estimate value Ex are values computed in the course of the trend processing. Also computed is the deviation $\sigma m$ by which the upper and lower control limits can be determined. The tool position adjusting value V is also computed when the estimated value exceeds the control limit. Details of the computation will be described hereinafter.

The estimated value Ex for the next work can be found from the gradient $a$ and intercept $b$. When the estimated value Ex is off the control limit range, tool position adjustment is instructed by the terminal device 26 and the adjustment value V obtained depending upon the presently computed value is delivered from the terminal device 26. By this instruction, tool position of machine $M_1$ may be adjusted. Thus, in the trend processing, an estimated value is found by extension of the trend obtained from actually measured values. This estimated value is used to control processing dimensions and accuracy. After being measured, the work is fed to processing machine $M_2$ for second step machining. After the second step machining, the work is transferred to measuring device 21 wherein the portions processed on the work are measured. As in the first step of the process, the work is subjected to trend processing based on the past measured values.

Although the number of data points may be arbitrarily determined, 18 data points are assumed for the sake of explanation. The computation for gradient $a$, deviation $\sigma m$ and other factors does not start unless data is completed for 18 points. After 18 points of data are collected, computation is continued until defective quality, cutting tool abnormality, or need for tool position adjustment is indicated. Trend processing is carried out using the gradient $a = 0$ (zero) and the previous dispersion $\sigma m$ until 18 data points are collected after the occurrence of defective quality, cutting tool abnormality or the need for tool position adjustment.

At the beginning of operation, the gradient $a = 0$ and the deviation $\sigma m$ of the previous day are applied directly to the trend processing.

Generally, on the condition that a proper amount of data is collected, the data may be expressed as an equation of regression, $X = at + b$, since there is a linear relationship among the individual measured values.

I. The gradient $a$ of the equation of regression is approximated by the method of least squares where the square root of the deviation between the measured value $Xt$ and the value $X$ estimated from the above linear relationship is at a minimum. The gradient $a$ is expressed generally as follows:

$$a = \frac{Ctx}{\sigma t^2} \qquad (1)$$

where $$Ctx = \frac{1}{N} \sum_{t=1}^{N} tXt - (mt)(mx)$$

$$\sigma t^2 = \frac{1}{N} \sum_{t=1}^{N} t^2 - (mt)^2$$

$$mt = \frac{1}{N} \sum_{t=1}^{N} t$$

$$mx = \frac{1}{N} \sum_{t=1}^{N} Xt$$

$t$ : the number of data; $t = 1, 2, 3, \ldots N$

II. The intercept $b$ is given as follows by the method of least squares.

$$b = mx - mt \cdot a \qquad (2)$$

III. The estimated value $Ex$ is found by substituting the gradient $a$ and the intercept $b$ which have been derived from Eq. (1) and (2) for the above equation of regression and by designating the parameter t specifying the number of works to be measured.

IV. The deviation $\sigma m$ is determined in general by the following equation.

$$\sigma m = \frac{\overline{R}}{d_2{}^s} \qquad (3)$$

where $$\overline{R} = \frac{1}{l} \sum_{j=1}^{l} Rj$$

number of groups of measured values: $j = 1, 2, 3, \ldots l$
number of measured values in a group: $s = 1, 2, 3, \ldots k$ $d_2{}^s$ : coefficient depending on the number of measured values in group $s$: $d_2{}^s$ is generally computed by the following formula:

$$d_2{}^s = \int_{-\infty}^{\infty} [1 - (1 - \phi(x))^s - \phi(x)^s] \, dx$$

$$(x) = \int_{\infty} \frac{1}{\sqrt{2\pi}} e^{\frac{-u^2}{2}} du$$

$$u = \frac{x - \bar{x}}{\sigma m}$$

where
$\sigma m$ = standard deviation
$\bar{x}$ = arithmetic mean of measured values
$x$ = measured value
For example, $d_2{}^s$ equals 1.128, 1.693, 2.059 for $s = 2$, 3, 4, respectively.

$d_2{}^s$ merely indicates the coefficient for a number $s$ of measured values in a group and does not indicate the $s$ power of $d_2$.

$Rj$ is the differential between the maximum and minimum measured values in the group.

V. The upper control limit UCL and the lower control limit LCL can be determined depending upon either mechanical deviation $\sigma m$ or processing deviation $\sigma p$. (FIG. 2)

a. Where the limits UCL and LCL are determined on the basis of $\sigma m$:

$$UCLm = UL - \gamma \sigma m$$

$$LCLm = LL + \gamma \sigma m$$

b. Where the limits are determined on the basis of $\sigma p$:

$$UCLp = CL + K \sigma p$$
$$LCLp = CL - K \sigma p$$

wherein
$UL$: upper tolerance
$LL$: lower tolerance
$CL$: $(UL + LL)/2$
$\sigma p$: $(UL - LL)/6 \cdot Cp$
$Cp$; processing capability coefficient (For example, $Cp = 1.33$)
$\gamma, K$: parameters predetermined according to the process step.

The values UCL and LCL are determined in relation to UCLp versus UCLm, and LCLp versus LCLm, in the following manner.

$UCLp$ is taken as $UCL$ when $UCLp \geq UCLm$
$UCLm$ is taken as $UCL$ when $UCLm \geq UCLp$
$LCLp$ is taken as $LCL$ when $LCLp \leq LCLm$
$LCLm$ is taken as $LCL$ when $LCLm \leq LCLp$ If $UCL$ and $LCL$ are larger than $UL$ and $LL$ respectively, then $UL$ is taken as $UCL$, and $LL$ as $LCL$.

VI. The tool position adjustment instruction is delivered in the following events.

1. $Ex + \alpha_1 \cdot \sigma m \geq UCL, Ex - \alpha_1 \cdot \sigma m \leq LCL$
2. When the measured values are beyond $UCL$ or $LCL$ at $n$ points in succession.

In FIG. 2, the adjustment instruction is delievered when $Ex + \alpha_1 \cdot \sigma m$ exceeds the upper control limit $UCL$, or the measured values exceed the lower control limit $LCL$ at two points in succession. (The symbols $\alpha_1$, and $n$ denote parameters given by the operator according to process step.)

VII. The tool position adjustment value V is determined as follows.

1. When $Ex + \alpha_1 \cdot \sigma m \geq UCL$: $V = - |Ex - (LCL + \alpha_2 \cdot \sigma m)|$
If $a = 0$, then $V = - |UCL - (LCL + \alpha_2 \cdot \sigma m)|$
2. When the measured values exceed $LCL$:

$$V = |CL - EX|$$

If $a = 0$, then $V = |CL - LCL|$

The above conditions are based on the assumption that the direction from $LL$ to $UL$ is positive, and from $UL$ to $LL$ negative. The symbol $\alpha_2$ is a parameter given by the operator according to the process step.

VIII. The tool position adjustment test is performed to find out if the tool position adjustment has been correctly carried out and is performed after work has been processed immediately after the tool position adjustment is measured. In the case of FIG. 2, where the size of the work increases in accordance with the progress of the machine processing, the tool position adjustment is determined not to have been correctly carried out if the measured value of the work processed immediately after the tool position adjustment is larger than $(X_b - \alpha_3 \sigma m)$ and is determined to have been correct if the measured value is smaller than $(X_b - \alpha_3 \sigma m)$.

In the case where the size of the work decreases in accordance with the progress of the machine processing, the tool position adjustment is determined to have been correctly carried out when the measured value is larger than $(X_b + \alpha_3 \sigma m)$. $X_b$ indicates the value on the regression line corresponding to the work immediately before the tool position adjustment is performed. The parameter $\alpha_3$ for the range of $\pm \alpha_3 \cdot \sigma m$ is selected so that this range is larger than the range of normal distribution of deviation of actually measured values and so that an actually measured value exceeds this range only when an artificial factor and/or abnormal factor is exerted on the processing. The parameters $\gamma$ and $K$ which determine the control limits, the parameters $\alpha_1$ and $n$ which determine the critical region, the parameter $\alpha_2$ which determines the adjustment value, and the parameter $\alpha_3$ for the tool position adjustment test may be modified on-line by a parameter modification instruction through teletypewriter 12 which can effect an interruption even during data processing. These parameters will hereinafter be termined collectively "control coefficients" on which the control characteristic of the trend processing depends.

Figure 3:
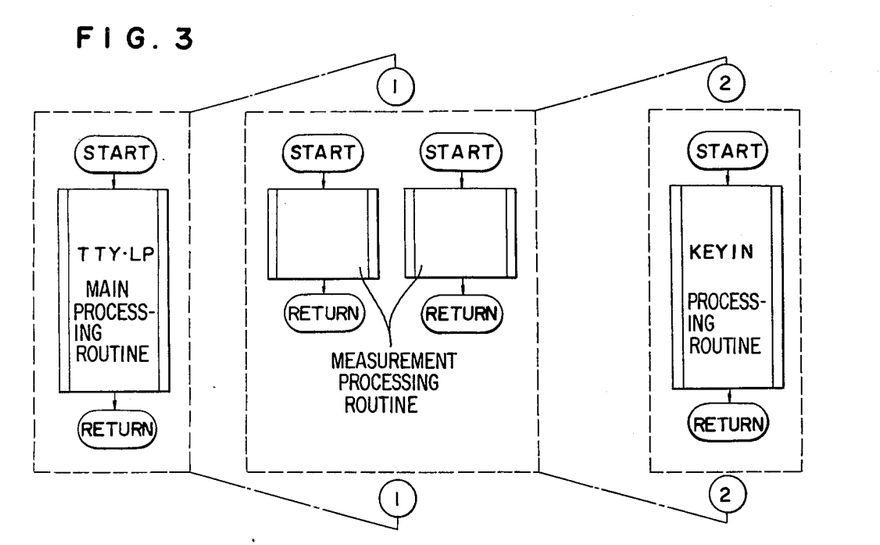
FIG. 3 is a flow chart of a program used to control the system of the invention.

A control program used in a system capable of processing various data for various purposes including trend processing computation will be described below. Referring to FIG. 3, there is shown a general chart. The main program is a main processing routine for the outputs from the teletypewriter and the line printer. Measurement processing routines which are available by interrupting the main program are provided for the measuring devices 20 and 21. Also, a key-in processing routine of interrupt level higher than the measurement processing routine is provided.

These routines are controlled on-line. If an interrupt is initiated by the measurement processing routine for the measuring device 20 during execution of the main program, the execution of the main program is halted and the data being processed in accordance therewith is temporarily restored in the memory of the computer 10.

After the interrupt the data that was being processed is transferred to a predetermined portion of the memory of the computer. Thereafter, the data for the processing routine which has priority is prepared for processing and the measurement processing routine is executed. During this routine, the foregoing trend processing routine can be performed. If an interrupt is required by the key-in processing routine during execution of the measurement processing routine for the measuring device 20, the key-in processing routine is executed after the interrupt treatment whereby parameters γ, K, α₁, α₂, α₃ and $n$ are modified. Then the processing returns to the interrupted point of the measurement processing routine whereupon the execution thereof is resumed. When interrupts are required from the processing routines of the same level, for example, the measurement processing routines, the earlier one is processed in preference to the other. Then, after return to the main program, the other processing routine is executed.

Figure 4:
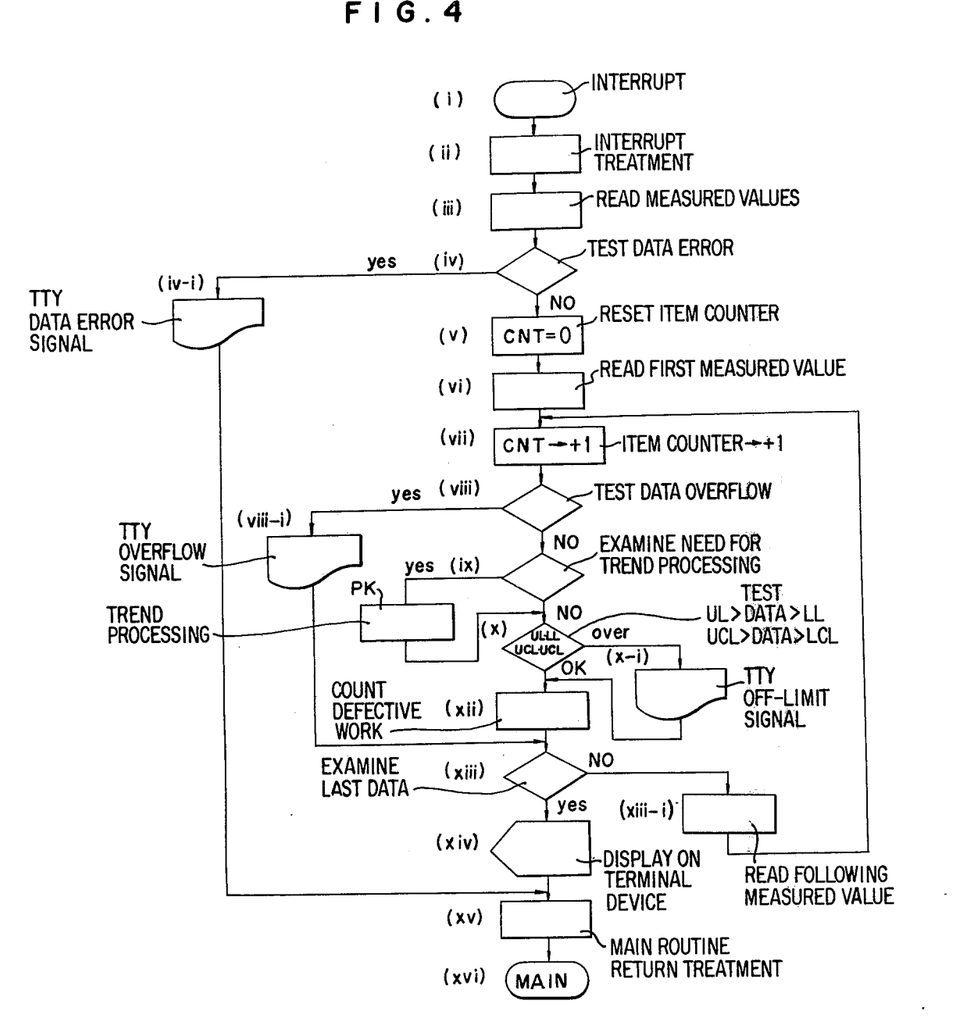
FIG. 4 is a flow chart of a processing routine used in connection with the measuring device.
Figure 5:
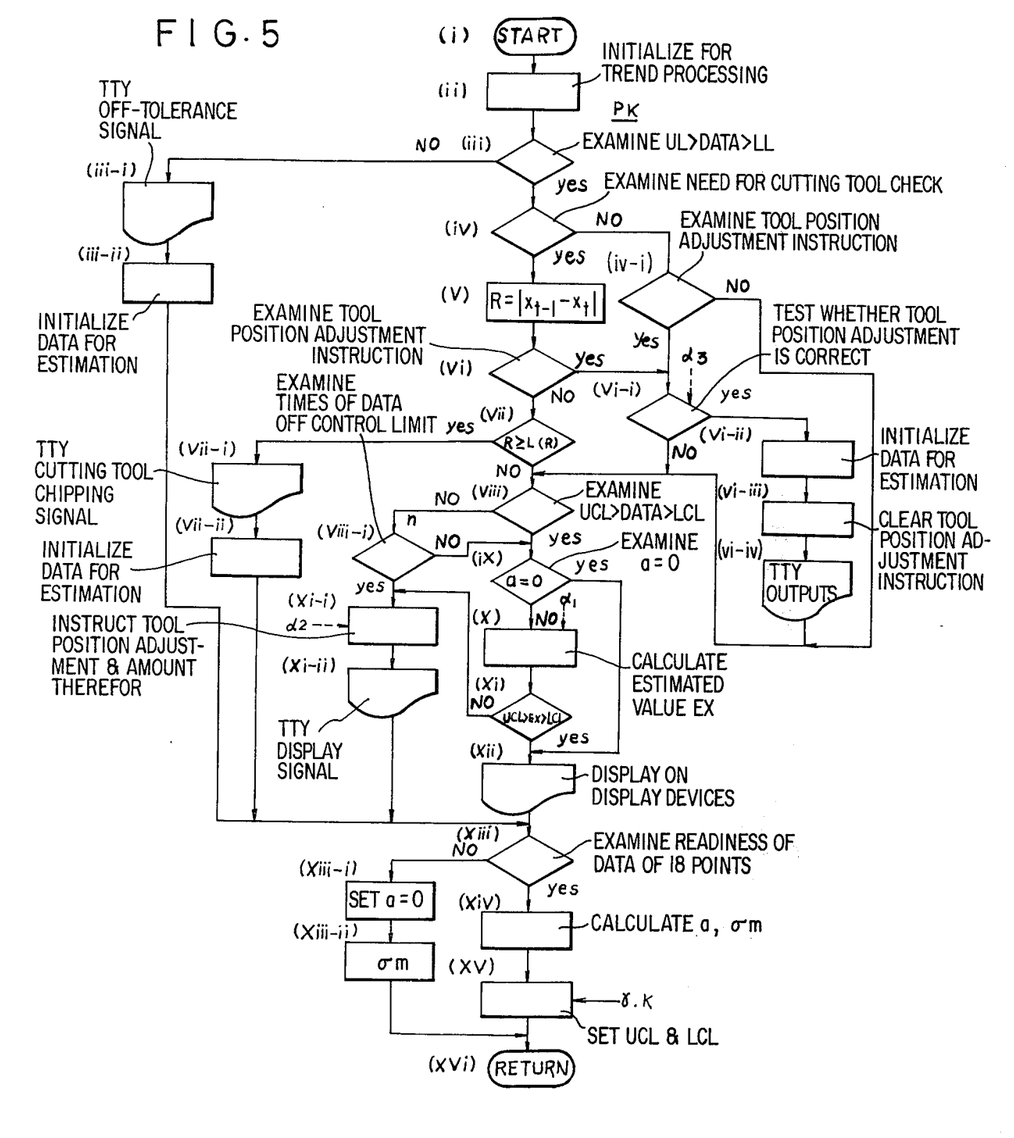
FIG. 5 is a flow chart of a key-in processing routine used in connection with the measuring device.

FIGS. 4 and 5 show flow charts of measurement processing routines for the values measured by measuring device 20. Similar flow charts may be available for the measuring device 21, but a description thereof is omitted in order to avoid repetition. When an interrupt (i) of this routine occurs, the interrupt treatment (ii) of the main program is executed and the values measured by the measuring device 20 are read in the step (iii) to be stored in the memory in a predetermined order according to the measuring items. In step (iv), the measured values are examined for errors due to processing machine $M_1$ and measuring device 20.

If an error is detected, a data error signal is delivered from the teletypewriter 12 and the processing is directed to the main program return treatment in the step (xv) so as to re-start the main processing routine. When no error is detected, step (v) is reached in which an item counter which is provided to count the number of the measuring items is set to zero. In step (vi), the measured value of the first measuring item is read-out from the memory to cause the counter to count up by 1. In step (viii), it is determined whether the read value overflows the A-D conversion region. In the event of overflow, an output is delivered from the teletypewriter and the routine goes to step (xiii). When there is no data over-flow, the routine goes to step (ix) in which the need for trend processing is examined. If necessary, trend processing is executed according to the trend processing program P$k$ shown in FIG. 5. If the trend processing is not required, step (x) examines whether the measured data is within the upper and lower control limits $UCL$ and $LCL$. If it is not within the limits, an off-limit signal is delivered from the teletypewriter 12 and the work is indicated as defective in step (xii). In the next step (xiii), according to the contents of the item counter, it is determined whether the measured data of the last item has been processed. When it is determined to be complete, the end of the measurement processing routine is displayed on terminal device 30 in step (xiv) and the processing returns to the main program in step (xvi). If the processing of the measured data is not complete, the value of the next measuring item is read from the memory in step (xiii-i) and the routine goes back to step (vii) to cause the item counter to count up by another 1. Thus, data processing is repeated in the foregoing manner. When the data of the last item is completed, the processing returns to the main program.

More details of trend processing program P$k$ will now be described by referring to FIG. 5. When the trend processing is required in step (ix) as in FIG. 4, the processing goes to the processing routine of FIG. 5, and program execution starts in step (i). First, the routine is initialized for preparing the start of trend processing in step (ii). Then, in step (iii), a determination is made whether the data read in steps (vi) and (xiii-i) of FIG. 4 are within the tolerances $UL$ and $LL$. If the data are not within the range of $UL$ and $LL$, an off-tolerance signal is generated by the teletypewriter 12 whereby the data used in the trend processing are cleared and are directed to step (iii-ii).

Step (xiii) is next. When the data is within the tolerance range, the need for a cutting tool check is examined in step (iv). It is to be noted that step (iv) is provided to determine whether the relevant cutting tool is of the breakable type, since the following steps (v), (vi) and (vii) are not necessary for unbreakable tools. If it is determined that these steps are unnecessary, step (iv-i) determines whether the tool position adjustment is proper. This determination is performed according to the state of a flip-flop which stores the data that the estimated value Ex which is tested in step (xi-i) is beyond the control limit or that the measured value has been beyond the control limit a predetermined number of times, in this particular case, 2 times. If not, the routine goes to step (viii). If so, the tool position adjustment test is performed to examine in step (vi-i) whether the tool position adjustment was correctly carried out as previously described in (VIII).

If the cutting tool check is found to be necessary in step (iv), the deviation R is found by computing the difference between the previously measured value $X_{t-1}$ and the presently measured value $X_t$. In the next step (vi), it is determined whether the tool position adjustment instruction was given. When the tool position adjustment is found to be given, the routine again moves to step (vi-i) to perform the tool position adjustment test.

If the tool position adjustment is found to have been correctly carried out, the data are initialized in step (iv-ii) and, thereafter, the tool position adjustment instruction is cleared in step (vi-iii). When the tool position adjustment is found not to be required in step (vi), the routine goes to step (vii) in which it is determined whether the range R exceeds a predetermined tolerable limit L(R). If so, this signifies that the cutting tool has been broken or has been chipped. In such an event, an output signal indicating "chipping" is delivered from the teletypewriter 12 and such chipping of the cutting tool is displayed on the terminal devices 26 and 30. At the same time, the data are reinitialized. When the deviation $R$ is smaller than the predetermined limit $L(R)$, it is determined in step (viii) whether the measured value is within the range of control limits $UCL$ and $LCL$. If the measured value is without the range, it is determined in step (viii-i) whether the measured value has been without the control range a given number of times.

If the measured value is shown to be outside the acceptable range more than 2 times, tool position adjustment is instructed and adjustment value $V$ is computed. By the instruction of tool position adjustment, the automatic tool position adjusting device is operated so that the tool position is automatically corrected by the computed adjustment value $V$. In the case of a grinding machine having an automatic sizing device, the sizing device is operated by the position adjusting instruction so that the probes thereof are automatically corrected by the computed adjustment value $V$. In a system for manual adjustment, the operator is informed of the need for the tool position adjustment through an alarm such as a flashing lamp. At the same time, the adjustment value $V$ is directed to the terminal devices 26, 30 and the central display device 36. In case a work or works are stored between the processing machine and the measuring device, an initial adjustment amount $V$ is displayed on the terminal devices 26, 30 and the central display panel 36 or is directed to the processing machine when the value $Ex + \alpha_1 \sigma m$ first exceeds the upper control limit $UCL$. Thereafter, a differential between presently and previously measured values is displayed or instructed as an adjustment amount until the adjustment is made on the work. Thus, all the works between the processing machine and the measuring device are completed to be measured. When the measured value is not without the acceptable a given number of times or more the processing moves to step (ix) to determine whether the gradient $a$ is equal to 0.

When $a = 0$, the processing moves to step (xii) to effect a display on the terminal devices 26, 30 and the central display panel 36. It is to be noted that the gradient a is set to be 0 as long as the data of the 18 points are not collected. If $a \neq 0$, the estimated value $Ex$ is calculated in step (x) and it is determined in step (xi) whether the estimate value $Ex$ is within the range of control limits $UCL$ and $LCL$. If the value $Ex$ is within the range, the processing proceeds to the next step (xii) to display the normality of measured values. If not within the range, the processing moves to step (xi-i) to instruct the tool position adjustment and to calculate the amount $V$ of the tool position adjustment. In step (xiii), it is determined whether 18 points of measured values have been collected for each individual measuring item. If collected, the gradient $a$ and the deviation $\sigma m$ are computed on the basis of such collected values in step (xiv). If not collected, the gradient $a$ is taken as 0 in step (xiii-i) and the deviation $\sigma m$ is left as it is in step (xiii-ii).

In step (xv), the control limits $UCL$ and $LCL$ are set according to the deviation $\sigma m$ computed. For this setting, the process capability coefficient $Cp$ is taken into consideration as described in (V) above. Then, after the trend processing, the processing moves to step (xiii-i) of FIG. 4 to read out the data of the measured value of the following item from the memory. Another trend processing is then performed in the foregoing manner. Thus, $\sigma$ measured values covering a large number of measuring items are processed in succession. When the trend processing of the data of the last item is completed, the processing moves to step (xiv) from step (xiii) of FIG. 4 and thereafter, returns to the main program. Each time an interrupt is effected in the processing program of FIG. 4, one point of data is stored for each measuring item in the step (iii). Therefore, to make 18 points of data ready, an interrupt must occur at least 18 times. The number of interrupts is counted for each measuring item and, in step (xiii), it is determined whether the count value reaches 18 for each measuring item and the need for the computation of $a \cdot \sigma m$ is determined.

The parameters $\gamma$ and $K$ used when the control limits are computed in step (xv) in the trend processing program, the parameter $\alpha_1$ used when the estimate value $Ex$ is computed in step (x), the parameter n for setting in step (viii-i), the parameter $\alpha_2$ used when the adjustment value is computed in step (xi-i), and the parameter $\alpha_3$ used when tool position adjustment is tested in the step (vi-i) can be modified by the key-in processing routine whose interrupt level is higher than that of the foregoing processing routines.

Figure 6:
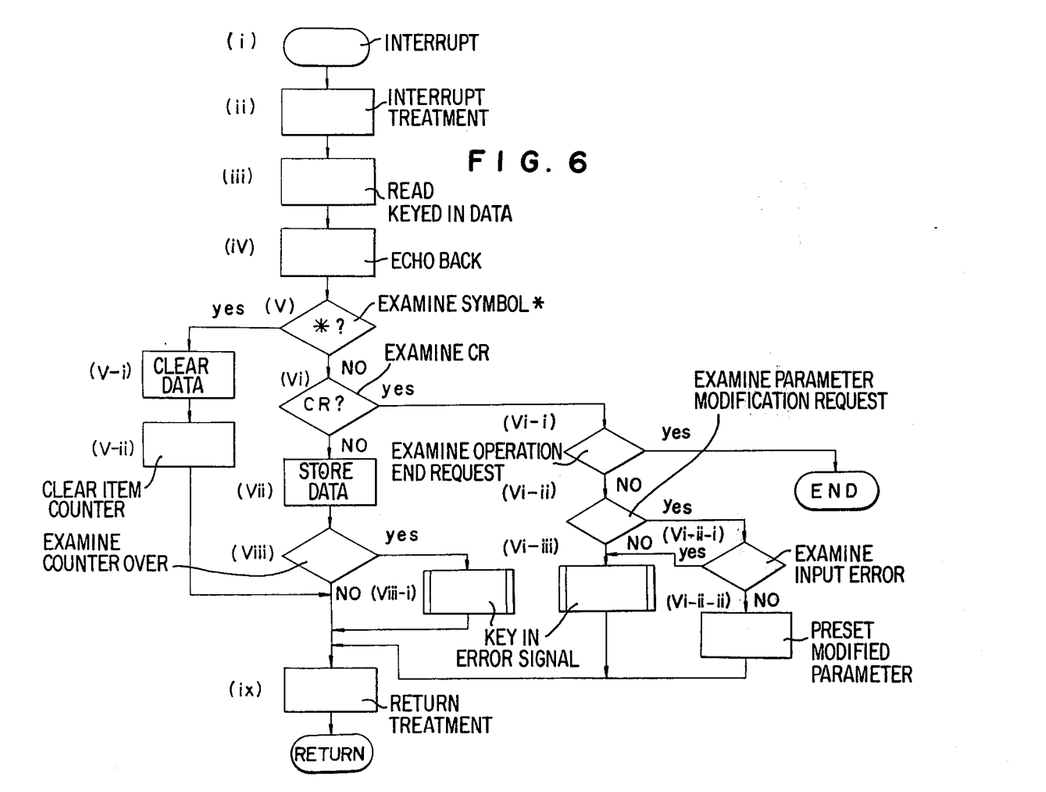
FIG. 6 is a flow chart of another key-in processing routine.

FIG. 6 shows an example of this key-in processing routine. An interrupt is effected in step (i) each time the key of teletypewriter 12 is depressed. The interrupt treatment is performed so as to halt the interrupted processing routine and to store the data being used in the interrupted processing routine in a predetermined portion of the memory. In step (iii), the keyed-in data of one character is read in by the computer 10 and the data which has been read in is immediately typed out. In steps (v) and (vi), the characters contained up to CR which follow the symbol * are recognized as meaningful characters by keying in the symbol*. When the symbol * keyed in at the head of meaningful characters is recognized, the data in predetermined addresses and an item counter are cleared in steps (vi-i) and (v-ii).

When a meaningful character is keyed in, data of the meaningful characters are stored in predetermined addresses of the memory, and the number of the meaningful characters are counted by the counter. In step (viii), it is determined whether the counter is overflowing. If so, a key-in error signal is generated. When all the meaningful characters are keyed in and stored in the memory of the computer, a return treatment is performed so that the interrupted processing routine is restored. When the last keyed-in character CR is recognized in step (vi), the processing moves to steps (vi-i), (vi-ii) whether the recognized data is an operation end request or a parameter modification request. All the data other than these requests are regarded as a key-in error so as to output a key-in signal in step (vi-iii) whereby return treatment is performed and the interrupted processing routine is restored. When an operation end request is read, the computer automatically assumes the interrupt inhibit state and no on-line data processing is performed. When a parameter modification request is sensed, the processing moves to step (vi-ii-ii) to examine input errors. When no error is found, the data stored in the individual parameter storage registers are rewritten in step (vi-ii-ii) by the data of the newly modified parameters. Thus, the interrupt is reset. In this manner, parameters can be modified on-line by key-in operation of the teletypewriter to meet specific mechanical characteristics thereby establishing desirable conditions for control.

According to the invention, as has been described in detail, all works are automatically measured, the series of characteristic change of the processing machines is extended towards the future based on the measured values, and the need for tool position adjustment is determined according to the trend of dimension and accuracy of the work processed. For work not yet processed, tool position adjustment is instructed if it is estimated that the work will not fall within the control limits. Therefore the occurrence of defective work can be efficiently prevented. Furthermore, the optimum adjusting value is determined on the last processed work in order to adjust the tool position with the result that a maximum number of works can be precisely processed when the tool position is adjusted but once and whereby the process cost can be markedly reduced. Still further, the control limits are automatically modified according to ever varying characteristics and the control coefficients are modified on-line instead of depending on fixed control limits as in the prior art. This minimizes the occurrence of defective works and reduces the frequency of need for tool position adjustment. Still further, the use of the system of the invention will no doubt contribute to the achievement of complete automation of a machine tool system which will not need a feedback function for quality control.

While the principles of the invention have been described above in connection with a specific embodiment and particular modifications thereof, it is to be clearly understood that this description is made only by way of example and not as a limitation on the scope of the invention.

What is claimed as new and desired to be secured by Letters Patent of the United States is:

1. An automatic quality control system for a machine for processing discrete workpieces wherein a parameter of processed workpieces varies in accordance with a trend comprising:
   measuring means separately disposed from said machine for generating information by measuring a plurality of workpieces processed thereby;
   converting means for converting information obtained from said processed workpieces into digital values;
   computing means responsive to said converting means for calculating by trend processing an estimated value for a yet unprocessed workpiece depending upon said digital values obtained from a plurality of preceding workpieces, for comparing said estimated value with a predetermined control limit and for generating an instruction signal when said estimated value is beyond the control limit; and
   instruction means for indicating a need of adjustment of said machine in response to said instruction signal.

2. An automatic quality control system according to claim 1, further comprising a device connected to said instruction means for adjusting the machine.

3. An automatic quality control system according to claim 1, wherein said computing means generates an instruction signal when measured values obtained from the processed workpieces are beyond said control limit more than a predetermined number of times in succession.

4. An automatic quality control system according to claim 1, wherein said instruction means is a display device for indicating the need of machine adjustment to a machine operator.

5. An automatic quality control system according to claim 1, wherein said computing means is operable to calculate deviation of said information and to determine said control limit according to said deviation.

6. An automatic quality control system according to claim 5, wherein said computing means is operable to test if an adjustment amount of said machine is within said deviation and to initialize said information utilized for calculating said estimated value when said adjustment amount is within said deviation.

7. An automatic quality control system for a machine for processing discrete workpieces wherein a parameter of successively processed workpieces varies in accordance with a trend comprising:
   measuring means separately disposed from said machine for generating information by measuring a plurality of workpieces processed thereby;
   converting means for converting information obtained from said processed workpieces into digital values;
   computing means for trend processing the digital values obtained from a plurality of said preceding workpieces;
   instruction means for indicating a need of adjustment of said machine in response to said computing means;
   said computing means operating to store measured values obtained from the processed workpieces, to calculate by trend processing the trend of said measured values, to calculate by trend processing an estimated value for a yet unprocessed workpiece in accordance with said trend, to determine if said estimated value is within predetermined control limits and to instruct adjustment of said machine when said estimated value is beyond said control limits.

8. An automatic quality control system according to claim 7, wherein said computing means calculates the deviation of said measured values and determines said control limits according to said deviation.

9. An automatic quality control system according to claim 8, wherein said computing means determines if an adjustment amount of said machine is within said deviation after said adjustment is instructed, and initializes measured values utilized for calculating said estimated value when said adjustment amount is within said deviation.

10. An automatic quality control system according to claim 7, wherein said computing means examines if each of said measured values is within said control limits and instructs an adjustment to said machine when said measured values are beyond said control limits more than a predetermined number of times in succession.

11. An automatic quality control system according to claim 7, wherein the adjustment instruction is performed in such a manner that an initial adjustment amount is instructed to said machine when said estimated value first exceeds said control limits and thereafter, a differential between presently and previously estimated values is instructed as an adjustment amount until said adjustment instruction is first reflected in said measured value.

12. An automatic quality control system according to claim 7, wherein said computing means changes control coefficients for determining said control limits.

13. An automatic quality control system according to claim 7 wherein said computing means tests if a tool of said machine is breakable, if said tool is found to be breakable, examines if a differential between two successive values is within a predetermined value and initializes measured values utilized for calculating said estimated value when said differential is not within said predetermined value.

* * * * *